(12) United States Patent
Doh et al.

(10) Patent No.: US 7,206,521 B2
(45) Date of Patent: Apr. 17, 2007

(54) SIGNAL LEVEL DETECTING DEVICE FOR A BURST-MODE OPTICAL RECEIVER

(75) Inventors: Hee-Chan Doh, Suwon-shi (KR); Gil-Yong Park, Suwon-shi (KR); Shin-Hee Won, Seoul (KR); Yun-Je Oh, Yongin-shi (KR); Tae-Sung Park, Suwon-shi (KR); Hyeon-Cheol Ki, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 585 days.

(21) Appl. No.: 10/406,466

(22) Filed: Apr. 3, 2003

(65) Prior Publication Data

US 2003/0202803 A1  Oct. 30, 2003

(30) Foreign Application Priority Data

Apr. 26, 2002  (KR) ..................... 10-2002-0023046

(51) Int. Cl.
*H04B 10/06*  (2006.01)
(52) U.S. Cl. ..................................... 398/202; 398/206
(58) Field of Classification Search ............... 398/202, 398/206
See application file for complete search history.

(56) References Cited

U.S. PATENT DOCUMENTS 5,777,507 A * 7/1998 Kaminishi et al. .......... 327/514
5,822,104 A * 10/1998 Saito .......................... 398/202
5,892,609 A * 4/1999 Saruwatari .................. 398/202
6,684,032 B1 * 1/2004 Umeda ....................... 398/202
6,832,054 B2 * 12/2004 Kim ............................ 398/202
2002/0041417 A1 * 4/2002 Han et al. ................... 359/189
2002/0063937 A1 * 5/2002 Kikuchi ...................... 359/189

FOREIGN PATENT DOCUMENTS

| EP | 0735707 A2 | 10/1996 |
|---|---|---|
| JP | 08-288757 | 11/1996 |
| JP | 08-293838 | 11/1996 |
| JP | 10-224309 | 8/1998 |

* cited by examiner

*Primary Examiner*—Kenneth Vanderpuye
*Assistant Examiner*—Ken Malkowski
(74) *Attorney, Agent, or Firm*—Cha & Reiter, LLC.

(57) ABSTRACT

In an optical receiver having a pre-amplifier for converting a current signal outputted from an optical detector to a voltage signal, a signal level detecting device is provided to provide an LOS (loss of signal) signal and a reset signal from the output of the pre-amplifier. The signal level detecting device comprising: a capacitor for receiving the output from the pre-amplifier; first and second transistors each consisting of an emitter and a collector connected to the output of the pre-amplifier and a base connected to the collector; a third transistor having a collector connected to the collector of the first transistor and an emitter connected to the collector of the second transistor; and, a common emitter circuit with a pair of resistors connected, respectively, to the emitter and collector of the third transistor and capable of detecting the level of a signal inputted from the collector of the third transistor.

9 Claims, 7 Drawing Sheets

SIGNAL LEVEL DETECTING DEVICE FOR A BURST-MODE OPTICAL RECEIVER

CLAIM OF PRIORITY

This application claims priority to an application entitled "Signal Level Detecting Device for a Burst-Mode Optical Receiver," filed in the Korean Intellectual Property Office on Apr. 26, 2002 and assigned Serial No. 2002-23046, the contents of which are hereby incorporated by reference.

BACKGROUND OF THE INVENTION

1. Field of the Invention

The present invention relates to a burst-mode optical receiver, and more particularly to a burst-mode optical receiver capable of determining an input signal and generating on its own a reset signal for the initialization between packets intervals.

2. Description of the Related Art

The next generation of communication services require FTTH (Fiber-To-The Home) communications systems, which proves an optical fiber connected to subscribers' homes directly for enabling higher transmissions of data. It is costly, however, to replace the existing copper-based subscriber lines with this type of optical subscriber lines. To overcome this problem, PONs (Passive Optical Networks) are presently considered to provide low-cost optical subscriber lines for a faster data transmission.

Figure 1:
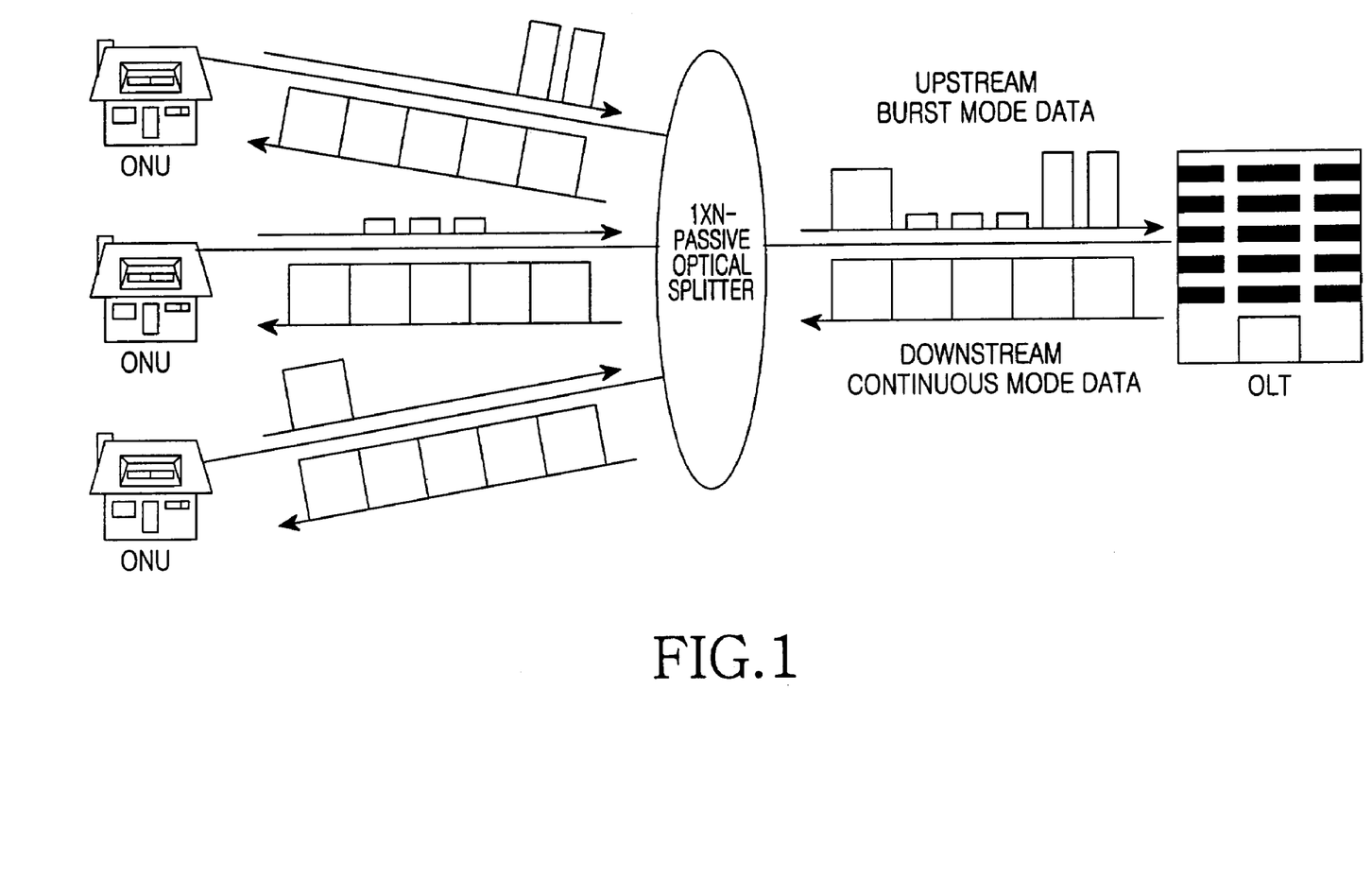
FIG. 1 illustrates a passive optical network system.

FIG. 1 illustrates a passive optical network system, which consists of an optical line termination (OLT) located in a central office, a 1×N passive optical splitter, and a plurality of optical network units (ONUs) located in the subscriber's premise.

As shown, each node transmits data or packets to another node using a predetermined time slot. The multi-access network is different from a point-to-point link in that it generates burst-mode data of varying sizes and phases due to the optical loss on different transmission paths. Also, the sizes of data packets received vary due to the difference in the transmission path lengths from and to the subscribers' premises. Note that it is possible for many subscribers to communicate via a single fiber optic strand using a time-division multiplexing scheme. Therefore, a current trend is to use a burst-mode optical receiver, which receives data of various sizes and phases, then restores the data back to the same size and phase for all received packets.

The burst-mode optical receiver excludes a DC block capacitor that has been used in AC coupling of a general receiver, thereby preventing a burst data loss during charge or discharge time of the capacitor. In addition, the burst-mode optical receiver extracts a detection threshold as a reference signal for data determination purposes from each burst packet being received. Thus, the burst-mode optical receiver must have a function of restoring data by amplifying the data based on the extracted detection threshold symmetrically.

Figure 2:
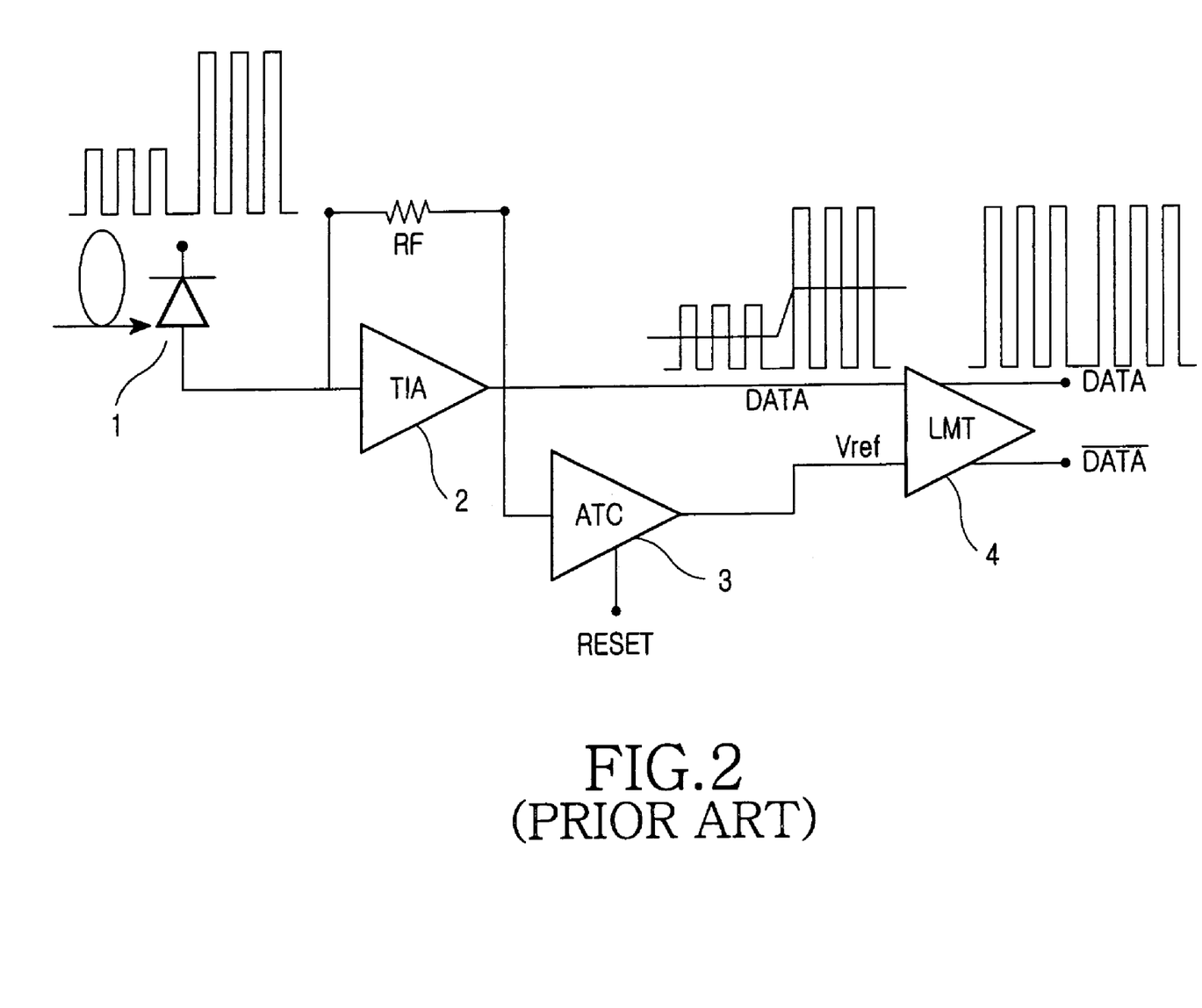
FIG. 2 shows the construction of a conventional burst-mode optical receiver.

FIG. 2 is a schematic view showing the construction of a conventional burst-mode optical receiver. The burst-mode optical receiver comprises an optical detector 1, a pre-amplifier 2, an automatic threshold controller (ATC) 3, and a limited amplifier 4.

The optical detector 1 converts an input optical signal to a current signal. The pre-amplifier 2 converts the current signal detected at the optical detector 1 to a voltage signal. A transimpedance, which refers to the ratio of an input current to an output voltage, is determined by a feedback resistor (Rf) that is connected to the input and output terminals of a transimpedance amplifier (TIA). The TIA 2 is a DC-coupled to be used in a burst-mode optical receiver. A signal in the TIA 2 is amplified and then divided into two segments. One segment of the signal is inputted to an ATC 3 to extract a detection threshold of the received packet, while the other segment is DC-coupled and inputted to a limited amplifier 4. The detection threshold that automatically changes according to the packet size is inputted to the Vref of the limited amplifier 4. The limited amplifier 4 amplifies signals of varying levels received therein in order to restore the signals to exhibit a uniform amplitude.

However, in the burst-mode optical receiver described above, a reset signal for the initialization of packet intervals is performed using an external circuit, which complicates the circuit of the optical receiver and increases the component size of the receiver. Therefore, there is a need for an improved optical receiver that is simple and reliable implementation.

SUMMARY OF THE INVENTION

The present invention overcomes the above-described problems, and provides additional advantages, by providing a burst-mode optical receiver that can determine an input signal and generate its own initial reset signal.

One aspect of the present invention is to provide an optical receiver that can determine the presence of a signal, regardless of the input DC levels, utilizing a turn-on voltage generating characteristic of a transistor.

Yet another aspect is that the present invention may be implemented in hardware, in software, or in a combination of hardware and software as desired for a particular application.

In one embodiment, an optical receiver having a pre-amplifier for converting a current signal outputted from an optical detector to a voltage signal and a signal level detecting device that can output an LOS (loss of signal) signal and a reset signal from the output of the pre-amplifier are provided. The signal level detecting device includes a capacitor for receiving the output from the pre-amplifier; first and second transistors each consisting of an emitter and a collector connected to the output of the pre-amplifier and a base connected to the collector; a third transistor having a collector connected to the collector of the first transistor and an emitter connected to the collector of the second transistor; and, a common emitter circuit having a pair of resistors connected respectively to the emitter and collector of the third transistor and capable of detecting the level of a signal inputted from the collector of the third transistor.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the drawings, the same element, although depicted in different drawings, will be designated by the same reference numeral or character. For the purposes of clarity and simplicity, a detailed description of known functions and configurations incorporated herein will be omitted as it may make the subject matter of the present invention unclear.

Figure 3:
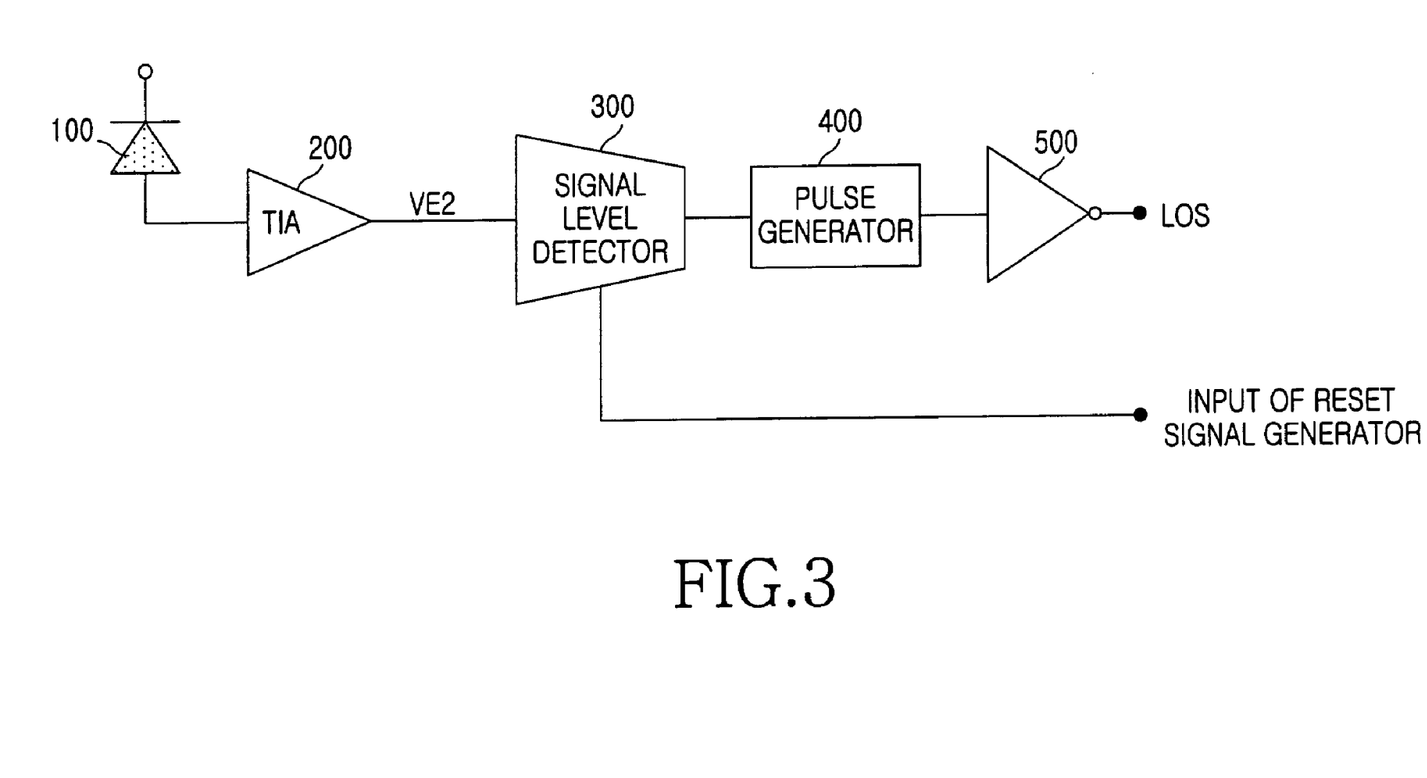
FIG. 3 shows the construction of a burst-mode optical receiver according to an embodiment of the present invention.

FIG. 3 shows the construction of a burst-mode optical receiver according to the embodiment of the present invention. As shown, the burst-mode optical receiver includes an optical detector 100, a transimpedance amplifier (TIA) 200, a signal level detector 300, a pulse generator 400, and an inverter 500.

In operation, the optical detector 100 converts an input burst optical signal to a current signal according to the intensity of the input optical signal. Then, the TIA 200 determines a gain and a bandwidth of the output signal from the optical detector 100. The TIA 200 also converts the current signal outputted from the optical detector 100 to a voltage signal and provides the voltage signal to the signal level detector 300. The output signal of the TIA 200, which is applied to the signal level detector 300, is coupled by a capacitor so that the signal level can be detected regardless of the DC level of the signal inputted.

The signal level detector 300 receives an output signal from the TIA 200 and detects the level of the signal in order to determine the intervals between the packets. One segment of the signal determined at the signal level detector 300 is applied to the pulse generator 400 and the inverter 500 in order to generate a LOS signal. The other segment of the signal is applied to the input terminal of a circuit for generating a reset signal. Note that the reset signal includes information related to the input signal, such as input current level and voltage level, and the voltage level of the reset signal corresponds to the TTL voltage level.

The pulse generator 400 generates a series of pulses to inform the start and end of a packet and the intervals between the packets. The pulse generator 400 receives an output from the signal level detector 300 and outputs a corresponding pulse signal. Also, the pulse generator 400 inverts the pulse signal via the inverter 500 and generates an LOS signal.

Figure 4:
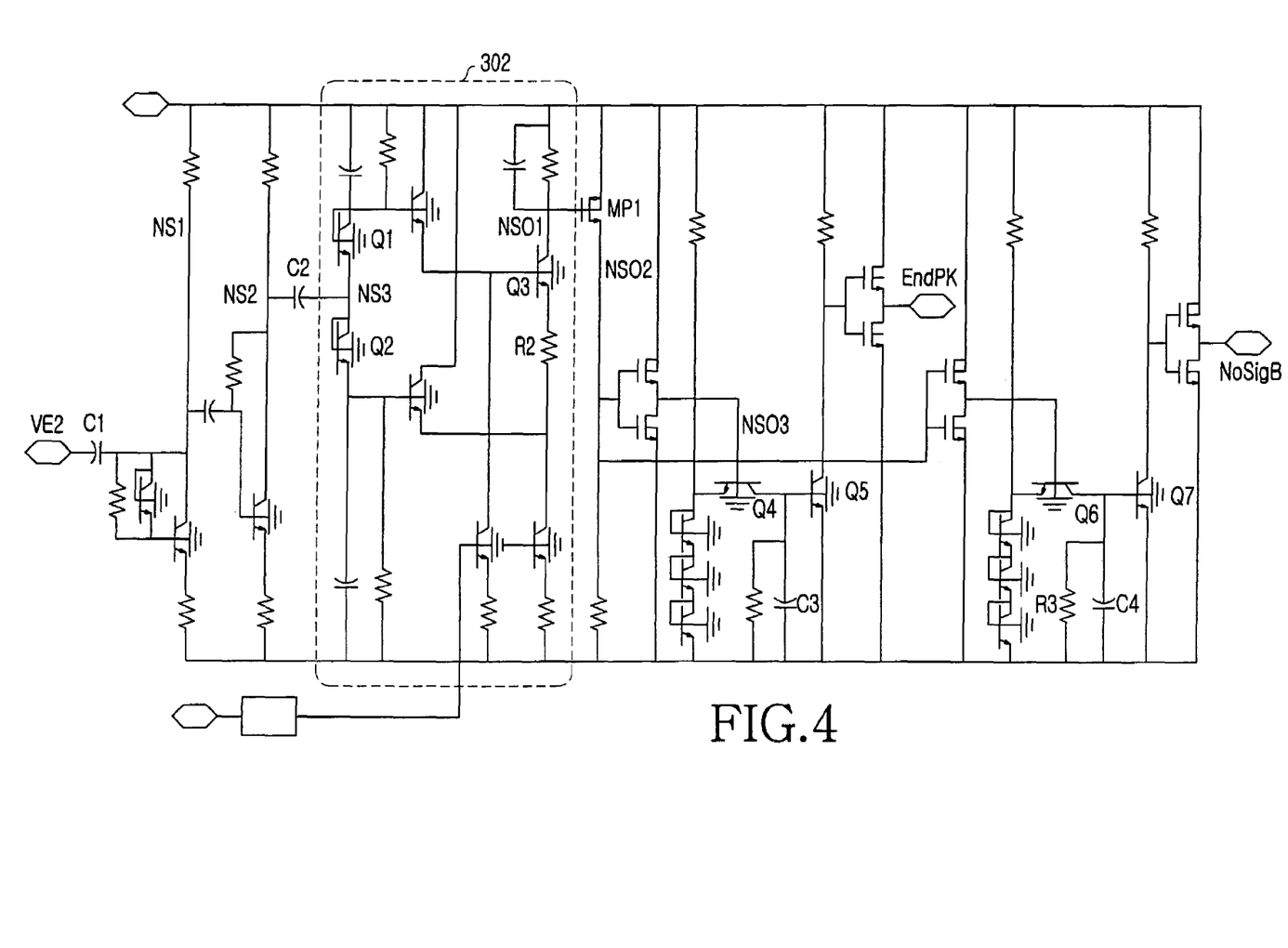
FIG. 4 is a circuit diagram of a signal level detector according to an embodiment of the present invention.
Figure 5:
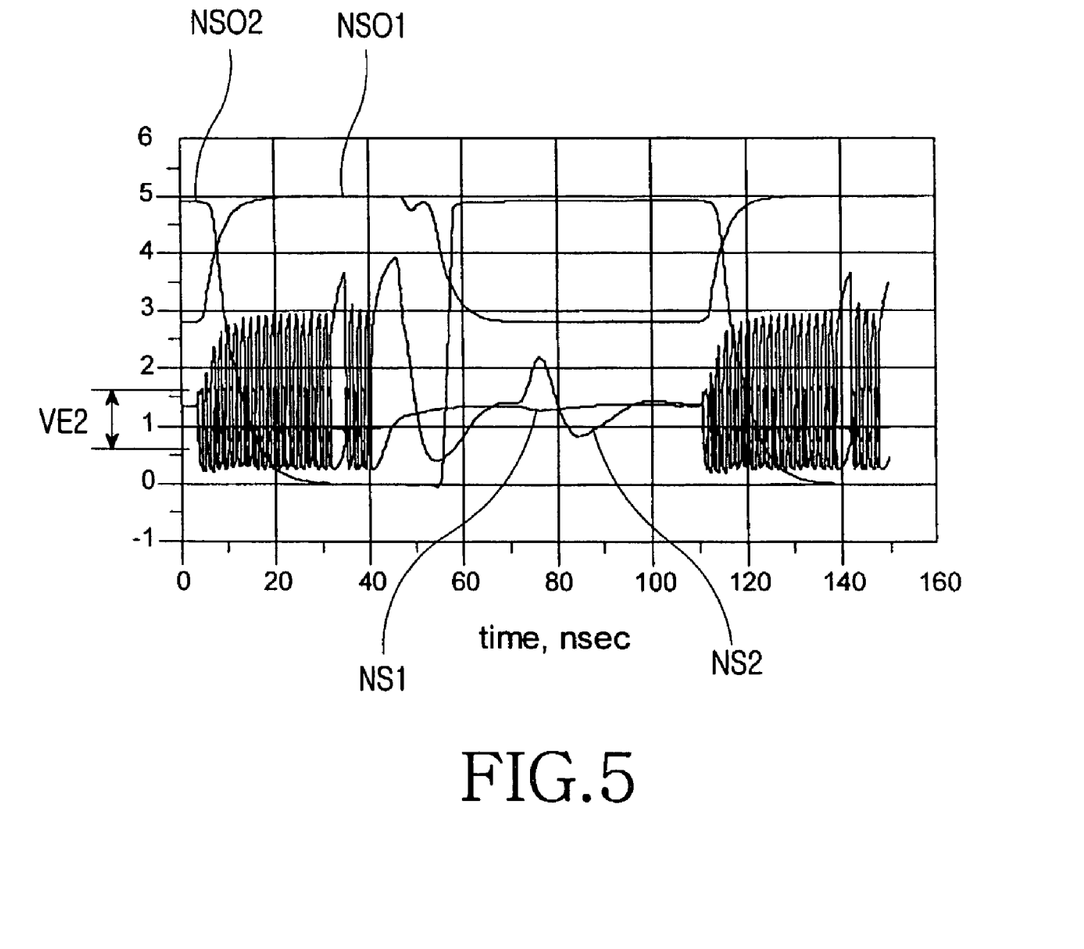
FIG. 5 is a wave form showing the output characteristic of each circuit terminal of the signal level detector with respect to an output signal from the TIA shown in FIG. 4.

FIG. 4 is a circuit diagram of the signal level detector 300 according to the embodiment of the present invention. FIG. 5 is a wave form showing the output characteristic of each circuit terminal of the signal level detector 300 with respect to an output signal from the TIA of FIG. 4. Note that FIG. 4 provides each terminal of the circuit outputting a plurality of waveforms as shown in FIG. 5 with a reference numeral or character representing a corresponding output waveform.

Referring to FIGS. 4 and 5, as explained above, the signal level detector 300 detects the level of an output signal VE2 from the TIA 200, thereby determining and informing the signal and the intervals between packets. In this regards, the signal level detector 300 according to the present invention has a capacitor C1 connected to the input terminal to which the output signal from the TIA 200 is inputted. As a result, the output signal VE2 is always coupled to the capacitor C1 so that the signal level detector 300 can detect the signal level regardless of the DC level of the signal inputted.

The output signal from the TIA 200 is inputted to a signal level detecting circuit 302, indicated as a dotted line in FIG. 4. The input terminal of the signal level detecting circuit 302 is connected to a capacitor C2, so that the signal level detecting circuit 302 can receive the signal via the capacitor C2. The input terminal of the signal level detecting circuit 302 is also connected to the emitter of a transistor Q1 and the collector of a transistor Q2. The transistors Q1 and Q2 with their emitters and collectors are connected to each other to operate as diodes. As such, when a signal inputted through the capacitor C2 has a level of 0V, the voltage between the emitter of the transistor Q1 and the collector of the transistor Q2 becomes a doubled diode turn-on voltage. This voltage is level-shifted to a diode turn-on voltage and then applied to the input voltage of a common emitter circuit having an emitter resistor, which consist of a resistor R1, a transistor Q3, and a resistor R2. At this time, the transistor Q3 turns on to lower the collector voltage, which shows that the inputted signal has a very low level.

When the level of a signal inputted through the capacitor C1 increases, the collector voltage of the transistor Q1 is lowered by the minimum level of the inputted signal, whereas the emitter voltage of the transistor Q2 is elevated by the maximum level of the inputted signal. Accordingly, the voltage between the emitter of the transistor Q1 and the collector of the transistor Q2 follows the following equation: (the doubled diode turn-on voltage)—(the swing width of the inputted signal). This voltage decreases as the level of the input signal increases. That is, a high collector voltage of the transistor Q3 means a high level of the inputted signal. Thus, the level of the inputted signal can be detected from the collector voltage of the transistor Q3.

If the signal level detecting circuit 302 determines the presence of an output signal NSO2 through the resistor R1, transistor Q3, resistor R2, and transistor MP1, the gate voltage of the transistor Q4 will be maintained to be "high" to turn on the transistor Q4. The capacitor C3 will then be charged to have a voltage of 3 times greater than the diode turn-on voltage. The drain voltage of the transistor Q5 will become "low" to show the presence of a signal at EndPK terminal. The output signal of the EndPK terminal is applied to a circuit for generating a reset signal in order to generate a reset signal.

Meanwhile, if the signal level detecting circuit 302 determines that no output signal VE2 is present, it will turn the gate voltage of the transistor Q6 to be "low" to turn off the transistor Q7. The capacitor C4 will begin to discharge at a voltage of 3 times greater than the diode turn-on voltage. After lapse of the discharge time set by the capacitor C4 and the resistor R3, the transistor Q6 will be turned off and the drain voltage of the transistor Q7 will become "high" to show that no signal is present, which is a signal NoSigB used to indicate the end of packets.

Figure 6:
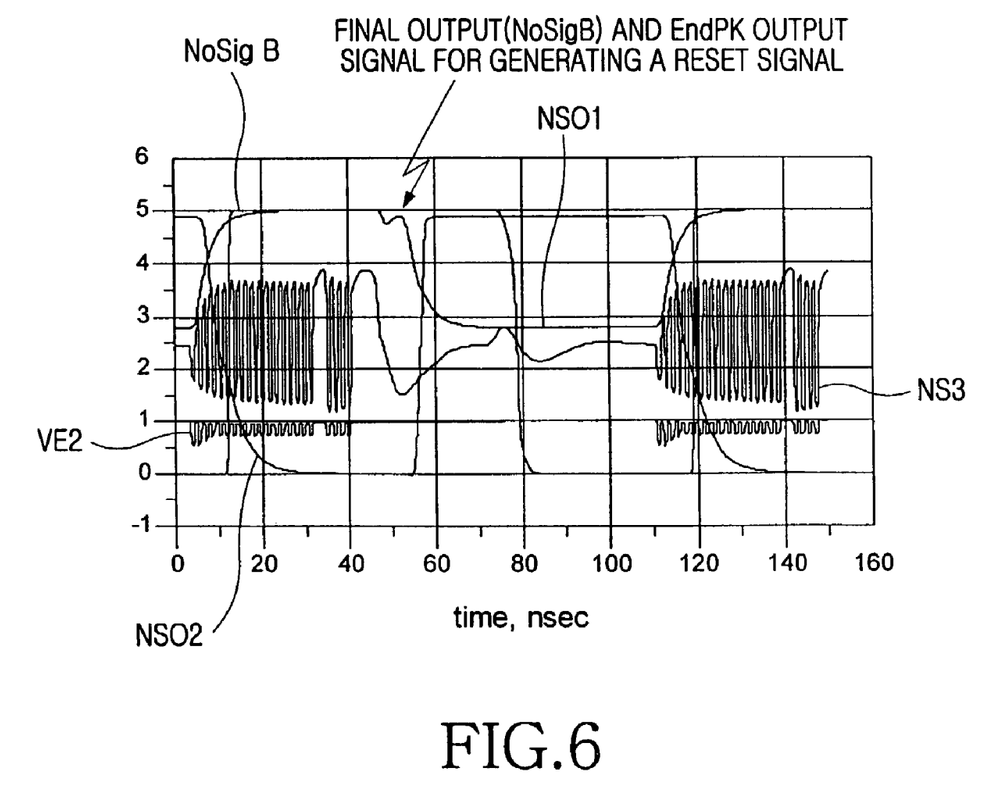
FIG. 6 is a wave form showing the final output of the signal level detector according to the present invention with respect to an output signal from TIA shown in FIG. 4.
Figure 7:
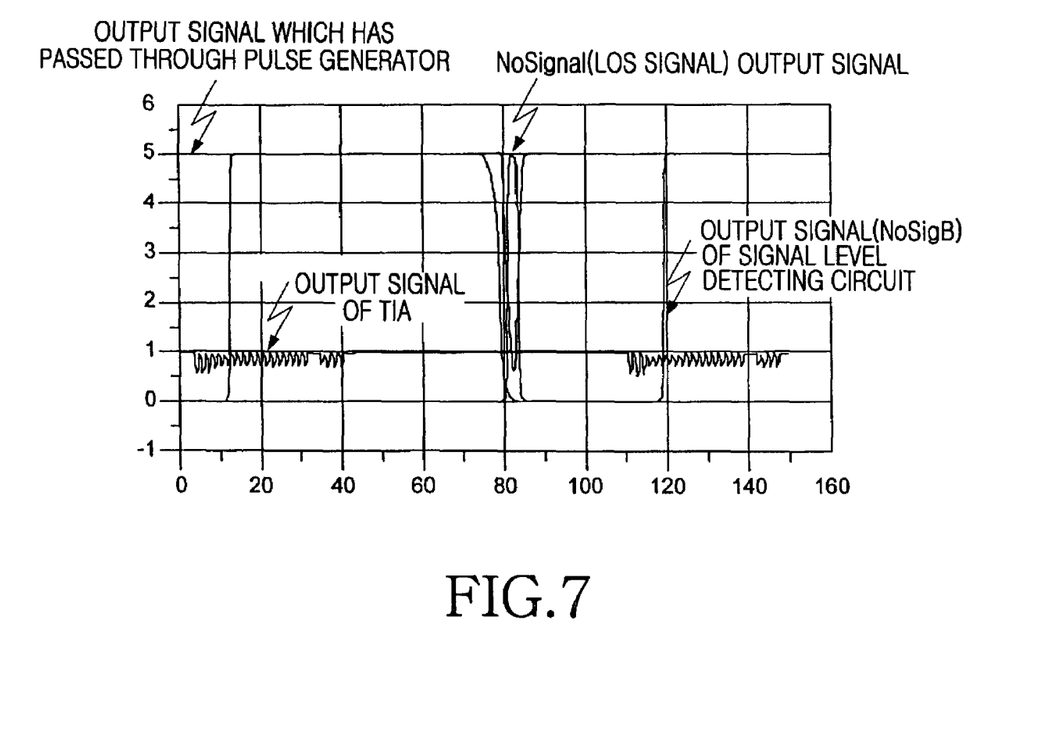
FIG. 7 is a wave form showing the output waveform of a pulse generator according to the output (NoSigB) of the signal level detector according to the present invention.

FIG. 6 is a wave form showing the final output of the signal level detector with respect to an output signal from the TIA of FIG. 4. As shown, the final output NoSigB signal is in "high" state at a block where the output signal from the TIA 200 is present, but in "low" state at a block where the output signal is not present. FIG. 7 is a wave form showing the output waveform of a pulse generator according to the output NoSigB of the signal level detector 300 of the present invention.

When the output signal NoSigB from the signal level detector 300 switches to a low state from a high state, the pulse generator 400 converts the output signal value into corresponding pulse interval. The output from the pulse generator 400 is applied to the inverter 500 and inverted to be outputted in a final LOS signal.

As is apparent from the foregoing, the present invention has an advantage in that the the burst-mode optical receiver according to the present invention can detect the level of an output signal of the TIA and generate on its own a reset signal for the initialization of intervals between the packets. Since no additional circuit is required to generate a rest signal, the present invention can reduce the component size of the receiver. Moreover, the present invention can detect a signal regardless of the DC level inputted to the TIA.

While the invention has been shown and described with reference to a certain preferred embodiment thereof, it will be understood by those skilled in the art that various changes in form and details may be made therein without departing from the spirit and scope of the invention as defined by the appended claims. Therefore, the present invention is not to be unduly limited to the embodiment set forth herein, but to be defined by the appended claims and equivalents thereof.

What is claimed is:

1. An optical receiver having a pre-amplifier for converting a current signal outputted from an optical detector to a voltage signal and a signal level detecting device for providing an LOS (loss of signal) signal and a reset signal from the output of the pre-amplifier, said signal level detecting device comprising:
   a first capacitor for receiving the output from the pre-amplifier;
   first and second transistors each comprising an emitter, a collector, and a base, wherein the emitter of the first transistor and the collector of the second transistor are connected to the output of the pre-amplifier, and the base of each transistor is connected to the collector of each, respective transistor;
   a third transistor having a collector that is connected to the collector of the first transistor and an emitter that is connected to the collector of the second transistor;
   a common emitter circuit having first and second resistors and detecting the level of a signal inputted from the collector of the third transistor, wherein the first resistor is connected to the emitter of the third transistor and the second resistor is connected to the collector of the third transistor;
   a fourth transistor connected to said common emitter circuit and turns on when an output signal is present;
   a second capacitor connected to the fourth transistor to charge a predetermined voltage when the fourth transistor turns on; and
   a fifth transistor connected to the fourth transistor to output a low signal when the fourth transistor turns on.

2. The signal level detecting device according to claim 1, further comprising:
   a sixth transistor connected to a collector of said common emitter circuit and turns off when no output signal is present;
   a third capacitor connected to the sixth transistor to discharge a predetermined voltage when the sixth transistor turns on; and,
   a seventh transistor connected to the sixth transistor to output a high signal when the sixth transistor turns off.

3. The signal level detecting device according to claim 1, wherein the first and second transistors Q1 and Q2 with the respective emitters and collectors are connected to each other to operate as diodes.

4. A burst-mode optical receiver comprising:
   an optical detector for converting an input burst optical signal comprised of packets to a corresponding current signal;
   an amplifier for converting the current signal to a corresponding voltage signal;
   a signal detector for detecting the level of the voltage signal and determining packet intervals of the input optical signal;
   a first capacitor interposed between the amplifier and the signal detector;
   a pulse generator coupled to receive the output of the signal detector and to generate a series of pulses indicative of a start and end of a packet and the packet intervals;
   a second capacitor for receiving the output from the amplifier via the first capacitor;
   first and second transistors each comprising an emitter, a collector, and a base, wherein the emitter of the first transistor and the collector of the second transistor are connected to the output of the pre-amplifier and the base connected to the collector;
   a third transistor having a collector that is connected to the collector of the first transistor and an emitter that is connected to the collector of the second transistor;
   a common emitter circuit having first and second resistors and detecting the level of a signal inputted from the collector of the third transistor, wherein the first resistor is connected to the emitter of the third transistor and the second resistor is coupled to the collector of the third transistor;
   a fourth transistor connected to the common emitter circuit and turns on when an output signal is present;
   a third capacitor connected to the fourth transistor to charge a predetermined voltage when the fourth transistor turns on; and
   a fifth transistor connected to the fourth transistor to output a low signal when the fourth transistor turns on.

5. The optical receiver of claim 4, further comprising an inverter coupled to receive the output of the pulse generator to provide a LOS (loss of signal) signal.

6. The optical receiver of claim 4, wherein the amplifier is a transimpedance amplifier (TIA).

7. The optical receiver of claim 4, wherein the signal detector is coupled to a capacitor so that the detected voltage signal level can be obtained regardless of the DC level of the voltage signal.

8. The optical receiver of claim 4, wherein the first and second transistors Q1 and Q2 with the respective emitters and collectors are connected to each other to operate as diodes.

9. The optical receiver of claim 8, the signal detector further comprising:
   a sixth transistor connected to a collector of the common emitter circuit and turns off when no output signal is present;
   a capacitor connected to the sixth transistor to discharge a predetermined voltage when the sixth transistor turns on; and,
   a seventh transistor connected to the sixth transistor to output a high signal when the sixth transistor turns off.

* * * * *